United States Patent
Leibfritz

(10) Patent No.: US 12,287,302 B2
(45) Date of Patent: Apr. 29, 2025

(54) METHOD AND MEASURING DEVICE FOR MEASURING OBJECTS BY MEANS OF X-RAY FLUORESCENCE

(71) Applicant: HELMUT FISCHER GMBH INSTITUT FÜR ELEKTRONIK UND MESSTECHNIK, Sindelfingen (DE)

(72) Inventor: Martin Leibfritz, Deckenpfronn (DE)

(73) Assignee: HELMUT FISCHER GMBH INSTITUT FÜR ELEKTRONIK UND MESSTECHNIK, Sindelfingen (DE)

( * ) Notice: Subject to any disclaimer, the term of this patent is extended or adjusted under 35 U.S.C. 154(b) by 334 days.

(21) Appl. No.: 17/970,278

(22) Filed: Oct. 20, 2022

(65) Prior Publication Data

US 2023/0127587 A1 Apr. 27, 2023

(30) Foreign Application Priority Data

Oct. 22, 2021 (DE) .......................... 102021127537.7

(51) Int. Cl.
   *G01N 23/223* (2006.01)
(52) U.S. Cl.
   CPC ..... *G01N 23/223* (2013.01); *G01N 2223/321* (2013.01)
(58) Field of Classification Search
   CPC .................. G01N 23/223; G01N 2223/321
   See application file for complete search history.

(56) References Cited

U.S. PATENT DOCUMENTS

| 7,258,485 | B2 | 8/2007 | Nakano et al. |
| 7,972,062 | B2 | 7/2011 | Nicolosi et al. |

(Continued)

FOREIGN PATENT DOCUMENTS

| CN | 112051291 A | 12/2020 |
| DE | 102016209557 A1 | 12/2017 |

(Continued)

OTHER PUBLICATIONS

Fischer/Fischerscope X-Ray XDLM—Tutorial Video Series Part Two: Standard Free Measurements, Calibration and Normalization. YouTube, Video—URL: https://www.youtube.com/watch?v=m6aSHVYFv18, published Sep. 21, 2018.

(Continued)

*Primary Examiner* — David P Porta
*Assistant Examiner* — Fani Polyzos Boosalis
(74) *Attorney, Agent, or Firm* — Jessica Smith; LOZA & LOZA, LLP

(57) ABSTRACT

A measurement object is placed on a region of a measuring table, and an overview image of the region of the measuring table is captured by an optical device. A type of the measurement object is determined from the overview image or from an identifier on the measurement object or an identifier positioned adjacently thereto. The position and/or the alignment of the measurement object on the measurement table is determined from the overview image. At least one measurement location of the measurement object is positioned in a measurement point of an X-ray fluorescence device and at least one measured value is determined from the at least one measurement location of the measurement object. The at least one measured value is compared with a setpoint value stored in a data processing device and a measurement result for the at least one measurement location of the measurement object is output.

20 Claims, 3 Drawing Sheets

(56) References Cited

U.S. PATENT DOCUMENTS

| | | |
|---|---|---|
| 10,800,315 B2 | 10/2020 | Kanck et al. |
| 11,181,356 B2 * | 11/2021 | Xu .................... G06Q 10/06316 |
| 11,347,368 B2 * | 5/2022 | O'Hare ............ G05B 19/41875 |
| 11,680,913 B2 * | 6/2023 | Sipilä .................... G01N 23/223 |
| | | 378/44 |
| 2001/0021240 A1 | 9/2001 | Kojima et al. |
| 2016/0011129 A1 | 1/2016 | Sakuta |
| 2019/0101889 A1 | 4/2019 | Riek et al. |

FOREIGN PATENT DOCUMENTS

| | | | |
|---|---|---|---|
| EP | 3029455 B1 | 6/2016 | |
| EP | 3889890 A1 * | 10/2021 | ........... G06T 7/0006 |
| JP | 2004216013 A | 8/2004 | |

OTHER PUBLICATIONS

Corresponding EP Application No. 22201094.4 Search Report (Feb. 17, 2023).

* cited by examiner

METHOD AND MEASURING DEVICE FOR MEASURING OBJECTS BY MEANS OF X-RAY FLUORESCENCE

CROSS REFERENCE TO RELATED APPLICATIONS

The present application claims priority under 35 U.S.C. § 119(a) to German Patent Application No. DE 10 2021 127 537.7, filed on Oct. 22, 2021, and entitled "METHOD AND MEASURING APPARATUS FOR MEASURING MEASUREMENT OBJECTS BY MEANS OF X-RAY FLUORESCENCE," which is incorporated by reference herein.

FIELD

The application relates to a method for measuring measurement objects on a measuring table of a measuring apparatus by means of X-ray fluorescence and to a measuring apparatus.

BACKGROUND

In many fields of industrial manufacturing, it is necessary to check and monitor the quality of measurement objects. In the case of quality control, on the one hand, a material analysis can be carried out. On the other hand, measurements of coatings, especially coating thicknesses, on a measurement object can form the basis of the quality check. To determine the layer thickness and to analyze the coating or the material of a measurement object, it is generally known to use an X-ray fluorescence method. In this process, a primary radiation is directed from a radiation source of an X-ray fluorescence device onto a measuring table measurement point, with which the measurement object is aligned or on which the measurement object rests. A secondary radiation emitted from the measurement surface of the measurement object is detected by a detector of the X-ray fluorescence device and forwarded to a control device or evaluation device.

Due to radiation protection regulations, such measuring apparatuses require a measuring chamber to be closed while the measurement object is being measured. Therefore, such measuring apparatuses have a housing cover or housing opening that can be opened and closed to allow access of the measurement object to the measuring chamber.

When carrying out quality checks, the measurement object in question is placed on a measuring table manually and in a defined position and alignment in order to carry out a measurement by approaching individual measurement points on the measurement object. Such quality checks are time-consuming due to the predefined positioning of the measurement objects on the measuring table.

Thus, there is a need for a method for measuring at least one measurement object on a measuring table of a measuring apparatus by means of X-ray fluorescence as well as a measuring apparatus for carrying out the method, so that an efficient carrying out of the quality control on measurement objects is possible.

SUMMARY

In one aspect described herein, a method for measuring measurement objects using X-ray fluorescence in a measurement apparatus includes providing a measuring table for measuring at least one measurement object and capturing an overview image of at least one region of the measuring table that includes a least a portion of the at least one measurement object. The method further includes determining a type of the measurement object from at least one of: the overview image, or an identifier provided on the at least one measurement object, or an identifier positioned adjacently to the at least one measurement object on the measuring table. The method further includes determining a position and/or an alignment of the at least one measurement object on the measuring table using the overview image; aligning at least one measurement location of the at least one measurement object with a measurement point of an X-ray fluorescence device; determining at least one measured value from the at least one measurement location of the measurement object using the X-ray fluorescence device; comparing the at least one measured value of the at least one measurement location of the measurement object with a setpoint value stored in a data processing device; and outputting a measurement result for the at least one measurement location of the measurement object.

In another aspect described herein, a measuring apparatus for measuring measurement objects includes a housing, a measuring table in the housing that is movable relative to the housing, and an X-ray fluorescence device comprising a radiation source and a detector that are aligned with a measurement point on the measuring table. A control device is configured to determine a position and/or an alignment of at least one measurement object on the measuring table; align at least one measurement location of the at least one measurement object with the measurement point of the X-ray fluorescence device; determine at least one measured value from the at least one measurement location of the measurement object using the X-ray fluorescence device; compare the at least one measured value of the at least one measurement location of the measurement object with a setpoint value stored in a data processing device; and output a measurement result for the at least one measurement location of the measurement object.

In one or more of the above aspects, a method includes capturing an overview image of a majority of a top surface area of the measuring table by an optical device.

In one or more of the above aspects, a method includes positioning an identifier on the at least one measurement object or adjacently to the at least one measurement object on the measuring table; processing the identifier, wherein the identifier includes a measurement task; and performing the measurement task by a control device.

In one or more of the above aspects, a method includes determining a tolerance range of the at least one measurement location of the measurement object.

In one or more of the above aspects, a method includes determining a position by the control system and/or the alignment of the measurement object in an X'/Y' measurement object coordinate system and mapping by the control device the position and/or the alignment of the measurement object in the X'/Y' measurement object coordinate system to an X/Y measuring table coordinate system.

In one or more of the above aspects, a method includes moving the measuring table in an X and/or Y direction to align the at least one measurement location of the at least one measurement object with the measurement point.

In one or more of the above aspects, the measurement results determined by the at least one measurement location of the measurement object in question are output with a good or bad indication assigned to the measurement locations.

In one or more of the above aspects, the good or bad indication is output assigned to the at least one measurement location of the measurement object.

In one or more of the above aspects, the determined measured value is additionally displayed at the relevant measurement location of the measurement object.

In one or more of the above aspects, after the detection or determination of the measurement task to be carried out, a calibration of the measuring apparatus as a function of the measurement task to be carried out is activated and carried out before the measurement task is started.

In one or more of the above aspects, a measuring chamber of the housing is opened at the beginning of the measurement task to be carried out and, after the measuring table has been equipped with the at least one measurement object, a measurement task is started by a start signal and initially the measuring chamber of the housing is closed, the measurements are carried out in accordance with the measurement task and, after the measurement task has been carried out, the measuring chamber of the housing is opened to remove the at least one measurement object.

In one or more of the above aspects, the measuring chamber of the housing is opened or closed by a housing cover which is pivotably, slidably, or movably controlled using a motor.

In one or more of the above aspects, for loading and unloading the at least one measurement object, the measuring table is moved into a loading and unloading position in which the measuring table is at least partially guided out of the closable measuring chamber of the housing, and in that, for carrying out the measurement task, the measuring table is moved into a working position which is located inside the measuring chamber.

In one or more of the above aspects, a measurement task to be carried out is started by a button element on the housing.

In one or more of the above aspects, a control device is configured to align the at least one measurement location of the at least one measurement object with the measurement point of the X-ray fluorescence device by controlling a motor to move the measuring table in an X and/or Y direction until the at least one measurement location of the at least one measurement object is aligned with the measurement point.

In one or more of the above aspects, an optical device is positioned in the housing, wherein the optical device is configured to capture an overview image of at least one region of the measuring table that includes the at least one measurement location of the measurement object.

In one or more of the above aspects, a control device is configured to determine a position and/or the alignment of the measurement object in an X'/Y' measurement object coordinate system using the overview image; map the position and/or the alignment of the measurement object in the X'/Y' measurement object coordinate system to an X/Y measuring table coordinate system; and align the at least one measurement object with the measurement point of the X-ray fluorescence device.

In one or more of the above aspects, a control device is configured to process an identifier captured in the overview image, wherein the identifier includes a type of the measurement object and a measurement task and perform the measurement task.

In one or more of the above aspects, a housing cover or a housing opening for opening and closing a measuring space in the housing, wherein the measuring table is accessible when the housing is opened for loading and unloading the measuring table with the at least one measurement object.

Other embodiments and details thereof are described and explained in more detail below with reference to the examples shown in the drawings. The features to be taken from the description and the drawings can be used individually or in any combination.

DETAILED DESCRIPTION

Figure 1:
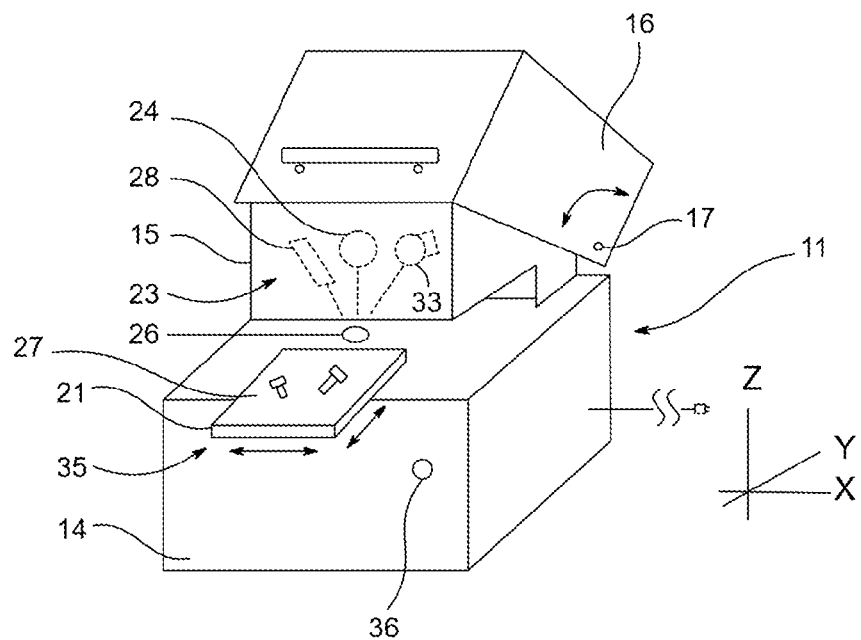
FIG. 1 shows a perspective view of an embodiment of a measuring apparatus.

A method for measuring at least one measurement object resting on a measuring table of a measuring apparatus, in which an overview image of at least one region of the measuring table on which the measurement object rests is captured by means of an optical device, in which the type of measurement object is determined from the overview image or from an identifier which is provided on the at least one measurement object or is positioned adjacently thereto, in which the position and/or the alignment of the at least one measurement object on the measuring table is determined from the overview image, in which a measurement task stored in a data processing device is selected and started by the control device for the at least one detected measurement object, in which at least one measurement location of the at least one measurement object is positioned in a measurement point of an X-ray fluorescence device and a measurement value is detected from the at least one measurement location of the measurement object, and in which the at least one measurement value of the at least one measurement object is compared with a setpoint value stored in the data processing device and the measurement result(s) for the at least one measurement location of the at least one measurement object is/are output.

The measurement object recognition allows one or more measurement objects to be placed on the measuring table of the measuring apparatus arbitrarily. This can be done manually or by a handling device. Due to this arbitrary arrangement and/or alignment of the at least one measurement object on the measuring table, a time saving can be made possible when loading the measuring table. On it, at least one measurement object is optically detected by an overview image and recognized according to type or detected by means of an identifier assigned to the measurement object. The position and/or the alignment of the at least one measurement object can also be determined from the overview image, so that all the prerequisites are present for subsequently carrying out an automated measurement, in which one or more measurement location of the at least one measurement object are positioned successively relative to a measurement point of the measuring table in the measuring apparatus, in order to capture and evaluate measured values from the various measurement locations of the measurement object by the emitted secondary radiation. By comparing the captured measured values from the at least one measurement location of the at least one measurement object with stored nominal values, the measurement results can be output and displayed in respect of whether they lie inside or outside a value range that is used as a basis for the quality check.

It is provided that an overview image of the entire measuring table, which is positioned in a measuring space inside the closed housing, is captured. In this way, the optical device can capture all the measurement objects located on the measuring table with only one image. At the same time, the position and/or the alignment of the at least one measurement object within the measuring table can be determined by an image evaluation algorithm.

In particular, it is provided that when an identifier placed on the measuring table or an identifier attached to the measurement object is recognized, this identifier is read out and the measurement task stored in this identifier is started and carried out. Such an identifier can be, for example, a QR code, a barcode or the like.

Furthermore, it can be provided that a tolerance range is assigned for each upcoming measurement task, in which one or more measurement locations of the measurement object will be interrogated. Depending on the measurement task or quality requirements, tolerance ranges can be selected to be larger or smaller. For example, several measurement locations can be assigned the same tolerance ranges and further measurement locations on the same measurement object can be assigned tolerance ranges that deviate from these, so that a quality check tailored to the function of the measurement objects can also be carried out.

In an embodiment, it is provided that a measurement object coordinate system is determined from the position and/or the alignment of the at least one measurement object. The coordinates of the measurement object coordinate system are transferred into a coordinate system of the measuring table by way of a transformation. In this way, the control device can control a movement of the measuring table in an X and/or Y direction in the measuring table plane and the individual measurement locations on the measurement object can be aligned in a defined manner relative to a measurement point with which the primary radiation of the X-ray fluorescence device is aligned.

In an embodiment, it is provided that after the capture of the measured values from the at least one measurement location of the measurement object, the measured values are output in a good or bad indication. This makes it easy for the operating personnel to see which of the measurement objects on the measuring table is to be rejected as a bad part. Furthermore, it can be output which measurement location on the measurement object is outside the tolerance range. If several measurement objects are rejected as bad parts because of the same measurement location, a specific conclusion can be drawn about a possible error in the production of the measurement objects.

In particular, it is provided that in the overview image each measurement location of the measurement object is assigned a region of the measuring table or of the entire measuring table and the good or bad indication is output. The determined measured value is additionally output at the measurement location in question. For example, a so-called pass-fail display can be provided, which can be easily understood by the operating personnel. The measurement location that lies within the tolerance range is marked with "Pass" and the measured values at the measurement location in question that lie outside the specified tolerance range are marked with "Fail".

After the detection or determination of the measurement task to be carried out for the at least one measurement object, a calibration of the measuring apparatus to the measurement task to be carried out can advantageously be activated and carried out before the measurement task is started. This has the advantage that the calibration can be carried out depending on the selected measurement task, whereby an improved measurement quality can be achieved.

It is provided that at the beginning of the measurement task the measuring space of the housing is opened and after the measuring table has been loaded with the at least one measurement object the measurement task is started by a start signal, the measuring space of the housing is closed and the measurement task is carried out and after carrying out the measurement task the measuring space of the housing is opened for removing the at least one measurement object. In this way, the measurement of the measurement object(s) resting on the measuring table can be carried out autonomously, so that the operating personnel have time available while the measurement is being carried out, for example to monitor another measuring apparatus or to prepare for another measurement.

Furthermore, it is provided that the measuring chamber of the housing is opened and closed by a pivotably, slidably, or movably controlled housing cover with a motor. This can increase the degree of automation when carrying out such measurements.

Furthermore, it is provided that for facilitated loading and unloading of measurement objects to be positioned on the measuring table, the measuring table is moved into a loading and unloading station in which the measuring table is at least partially guided out of the closable measuring space of the housing. The movement of the measuring table in this loading and unloading station can take place via the motor, which also controls the measuring table for a movement in order to move within the measuring space at least one measurement object with respect to the at least one measurement location to be detected.

The method for carrying out the selected measurement task is started by a button element on the housing. This enables simple operation.

A measuring apparatus for measuring measurement objects by means of X-ray fluorescence, said measuring apparatus comprising a housing as well as a measuring table which is provided in the housing and is movable relative to a measurement point of an X-ray fluorescence device in the housing, wherein a radiation source in the housing is aligned with the measurement point and the housing comprises a housing cover or a housing opening for opening and closing a measuring space in which the measuring table can be positioned, wherein the measuring apparatus has a control device with a data processing device for carrying out the method according to at least one or more of the preceding embodiments.

Such a measuring apparatus simplifies the handling and carrying out of the measurement task for the at least one measurement object. In addition, an increased degree of automation can be achieved, since the type of measurement object, the position and/or the alignment of the at least one measurement object can be detected from an overview image of an optical device in order to subsequently activate and carry out the measurement task.

Other advantageous embodiments and developments thereof are described and explained in greater detail below with reference to the examples shown in the drawings. The features to be taken from the description and the drawings can be used in accordance with the invention individually or in any combination.

Figure 2:
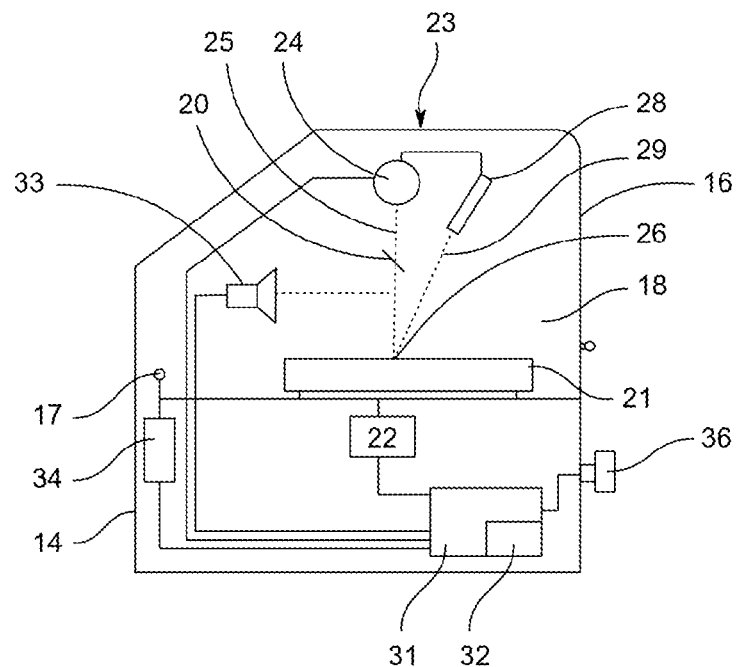
FIG. 2 shows a schematic sectional view of the embodiment of the measuring apparatus according to FIG. 1.

FIG. 1 shows a perspective view of a measuring apparatus 11. FIG. 2 shows a schematic side view of the measuring apparatus according to FIG. 1 in a sectional view. This measuring apparatus 11 is used to carry out a measurement on measurement objects by means of X-ray fluorescence. Measurement by means of X-ray fluorescence can be used to measure the layer thickness of coatings on measurement objects and/or to analyze the material of the measurement object.

The measuring apparatus 11 comprises a housing 12 with a lower housing part 14 and an upper housing part 15 as well as a housing cover 16. The housing cover 16 is, for example, pivotably mounted about a pivot axis 17 so that a measuring chamber 18 provided in the housing 12 is accessible. Alternatively, the housing cover 16 can also be movable or displaceable relative to the housing 12 by means of a further mechanism. Also, instead of a pivotable housing cover 16, a housing opening can be provided which allows access to the measuring chamber 18.

The lower housing part 14 accommodates a measuring table 21 movably on an upper side. This measuring table 21 is driven to move in the X and Y directions by a motor 22. The measuring table 21 is guided by a cross table or the like so that it can be movably guided relative to the lower housing part 14.

In the upper housing part 15 there is provided an X-ray fluorescence device 23. This comprises a radiation source 24 by which a primary radiation 25 is directed to a measurement point 26. Individual components arranged in the primary radiation 25, such as a shutter, a primary filter and/or a collimator, are not shown in more detail. Individual measurement objects 27, which for example rest on the measuring table 21, can be positioned aligned with the measurement point 26 in order to carry out a measurement. Adjacently to the radiation source 24 there is provided a detector 28, by which a secondary radiation 29 emitted by the measurement object 27 is detected. Both the radiation source 24 and the detector 28 are connected to a control device 31.

The X-ray fluorescence device 23 can be positioned either above or below the measurement point 26 in order to direct the primary radiation onto the measurement point 26 from above or below.

The control device 31 comprises a data processing device 32 so that measurement tasks can be stored and called up and/or so that determined measured values can be recorded, stored and/or evaluated and/or output in a display or the like.

There is provided in the upper housing part 15 an optical device 33, such as a CCD camera, by means of which an overview image of at least one region of the measuring table 21 or of the entire measuring table 21 can be captured. The optical device 33 can, for example, capture images of the measurement point 26 and/or of the measuring table 21 via a deflection mirror 20. The housing cover 16 can be automatically opened and closed via a motor 34, which in turn is connected to the control device 31. This provides easy access into the measuring chamber 18. On the lower housing part 14 there is a button element 36 by means of which the control device 31 can be started or stopped and/or controlled.

Advantageously, a display, screen or the like is connectable to the measuring apparatus 11. An indicator, a display or a screen can also be provided on the housing 12.

To facilitate loading of the measuring table 21 with the at least one measurement object 27 for the subsequent measurement task, the measuring table 21 can be transferred into a loading and unloading position 35. In this loading and unloading position 35, the measuring table 21 is at least partially extended out relative to the lower housing part 14. The housing cover 16, which can be lifted off the lower housing part 14, can provide improved access to the measuring table 21, which is arranged in the loading and unloading position 35. This loading and unloading position 35 of the measuring table is shown in FIG. 1.

To carry out the upcoming measurement task, the measuring table 21 is moved from the loading and unloading position 35 to a working position shown in FIG. 2. The measuring table 21 is positioned completely inside the measuring chamber 18. After closing the housing cover 16, the measuring table 21 is positioned completely within the closed measuring chamber 18.

Alternatively, it can be provided that the loading and unloading position 35 and the working position are the same position. In this case, the housing cover 16 is liftable or laterally displaceable relative to the lower housing part 14, so that again good access is provided for loading and unloading the measuring table 21 with the at least one measurement object 27. The measurement object(s) 27 can be placed on the measuring table 21 manually or also in automated fashion, for example with a controllable and/or programmable handling device.

Figure 3:
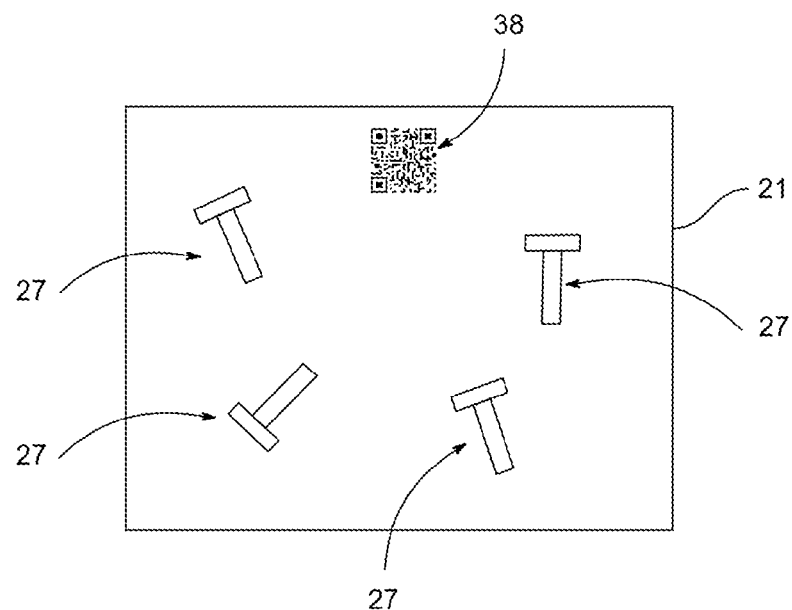
FIG. 3 shows a schematic view of an embodiment of the measuring table of the measuring apparatus according to FIG. 1 with measurement objects.

FIG. 3 shows a schematic view from above of the measuring table 21, on which several measurement objects 27 are placed. Several or all measurement objects 27 from a production batch that are to be inspected can be positioned on the measuring table 21. The position and/or the alignment can be arbitrary here. A so-called chaotic layout of the measurement objects 27 on the measuring table 21 may be provided, wherein these must not be positioned on top of or against each other on the measuring table 21.

In addition, an identifier 38 can be positioned on the measuring table 21. Such an identifier 38 can also be provided on or in the measurement object 27. The identifier 38 can also be positioned separately on the measuring table 21. This identifier 38 can contain various information. For example, a code by which a stored measurement task for a particular measurement object 27 is called up in the data processing device 32. Information can also be included, such as the type of measurement object and/or the measurement task, and/or the tolerances to be used as a basis for the measurement task. Such an identifier 38 may be, for example, a QR code or a bar code or other identifiers. Such an identifier 38 is detected by the optical device 33 so that the detected data is passed on to the control device 31 for a subsequent measurement task.

Figure 4:
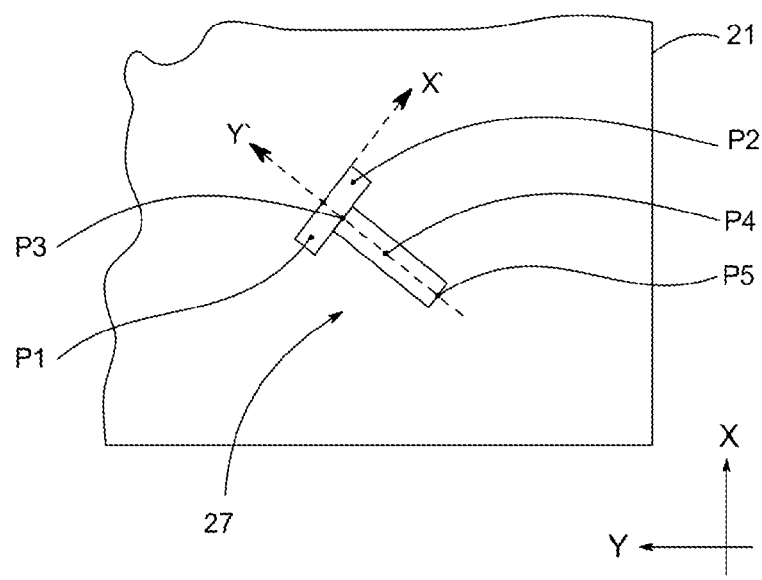
FIG. 4 shows a schematic partial view of the embodiment of the measuring table with the measurement object and its selected measurement locations.

FIG. 4 shows a schematic view of the one measurement object 27 on the measuring table 21. The measuring table 21 can be moved within an X/Y measuring table coordinate system. Each measurement object 27 has its own coordinate system with an X' axis and a Y' axis. For carrying out the measurement task in an automated fashion, the X'/Y' measurement object coordinate system is transformed into an X/Y measuring table coordinate system, so that subsequently a targeted traversing movement of the measuring table 21 can be controlled by the control device 31, in order to align, for example, at least one measurement location P1, P2, P3, P4, P5 of the measurement object 27 with the measurement point 26, in order to carry out the measurement at the at least one measurement location P1, P2, P3, P4, P5. The number of measurement locations of each measurement object 27 as well as the location of the at least one measurement location on the measurement object 27 depends on the measurement task and/or the quality control and can be selected and determined arbitrarily for each measurement object 27.

Figure 5:
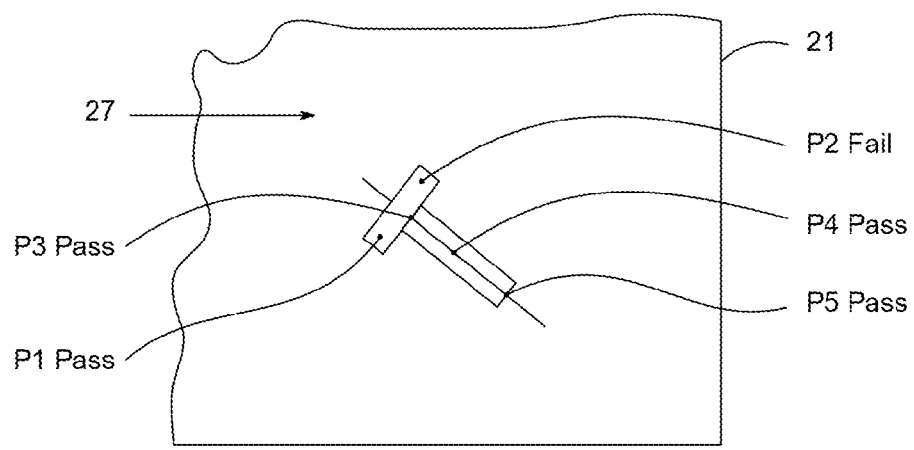
FIG. 5 shows a schematic partial view of the embodiment of the measuring table with the measurement object and the measurement results assigned to the measurement locations.

FIG. 5 shows a schematic view of the measurement object 27 after the measurement has been carried out and the measured values have been evaluated by comparing them with stored target values. The representation can be output in an indicator, a display or on a screen.

In the exemplary case, the measured values are presented by a so-called pass-fail display. For example, the word "Pass" is added to the measurement locations P1, P3, P4 and P5 of the measurement object 27, i.e., these measurement locations are found to be good, or the detected measured value of the measurement location is within the tolerance range of the particular associated setpoint value.

The measurement location P2 of the measurement object 27 has the designation "Fail", i.e., the detected measured value at the measurement location P2 is outside the tolerance range of the associated setpoint value. This makes it easy for the operating personnel to recognize which measurement object 27 on the measuring table 21 is a good or bad part. It is also easy to recognize which measurement location on the measurement object 27 does not meet the requirements.

This presentation of the measurement result for the measurement object 27 according to FIG. 5 has the advantage that it is also easy to draw conclusions about the measurement locations lying outside the specified tolerance range. Alternatively, instead of presenting the measurement results for the measurement task carried out, a tabular presentation of the measurement points with the associated numbers can also be output. For example, the measurement results can be provided with a colored background in that the measurement locations and/or measured values with a green background are presented as measurement points inside the tolerance range and, for example, measurement locations and/or measured values with a red background are labelled as outside the tolerance range.

Figure 6:
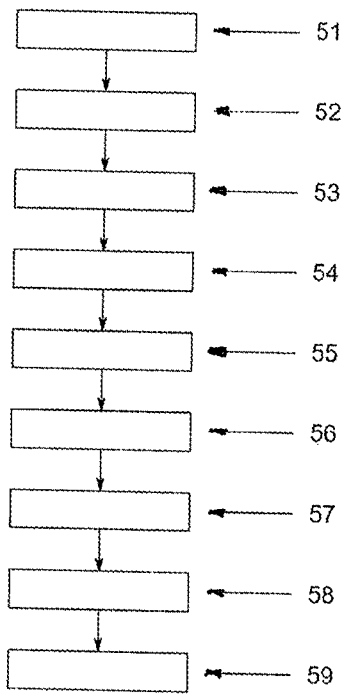
FIG. 6 shows a schematic flow diagram of an embodiment of a method for carrying out a measurement with the measuring apparatus according to FIG. 1.

The sequence program shown in FIG. 6 describes a method for the automated measuring of at least one measurement object 27 with a measuring apparatus 11 using X-ray fluorescence. The measuring apparatus 11 can be used here both for measuring the thickness of thin layers on the measurement object 27, i.e., for layer thickness analysis, and for material analysis. The procedure described hereinafter remains the same.

In step 51, the measuring apparatus 11 is transferred to a start position for the subsequent measurement task. This start position is shown in FIG. 1. The housing 12 is opened and the measuring table 21 is at least partially extended relative to the housing 12 and arranged in the loading and unloading position 35. Proceeding from this start position, the measuring table 21 is loaded with one or more measurement objects 27.

In step 52, the button element 36 on the housing 12 is actuated to carry out the automated measurement.

In step 53, the measuring table 21 is moved into the working position 37 and the housing cover 16 is closed by means of the motor 34. After the measuring chamber 18 is completely closed off from the surrounding environment, the optical device 33 generates an overview image of the measuring table 21 with the at least one measurement object 27 resting thereon in a step 54 and evaluates this overview image. The evaluation of the overview image, which is shown for example in FIG. 3, can be carried out by means of the data processing device 32, in which the characteristic data of the measurement object 27 can be stored, so that the at least one measurement object 27 resting on the measuring table 21 can be appraised by an evaluation of the detected image points.

If an identification 38 is placed on the measuring table 21 or if an identification 38 is applied to the measurement object 27 itself, this identification can be read out and at least the type of the measurement object 27 can be detected. Depending on the detected type of the measurement object 27, the measurement task is selected, and this is called up accordingly from the data processing device 32. The measurement task can also be determined from the identifier 38.

In a further step 55, the position and/or the alignment or orientation of the at least one measurement object 27 is determined from the overview image according to FIG. 3 by image processing algorithms.

Before the measurement task is carried out to carry out the measurement of the individual measurement objects 27, a calibration routine for the measuring apparatus 11 can be started. In this calibration routine, one or more calibration standards, which may also be positioned on the measuring table 21, can be transferred relative to the measurement point 26 in order to calibrate the X-ray fluorescence device 23 for the subsequent measurement task.

In a step 56, an X'/Y' measurement object coordinate system is defined for the measurement object 27 in question on the basis of the data from step 55. Based on the definition of the X'/Y' measurement object coordinate system, the individual measurement locations, for example the measurement locations P1 to P5, can be defined. Subsequently, the X'/Y' measurement object coordinate system is transformed into an X'/Y' measuring table coordinate system. Subsequently, the individual measurement locations P1 to P5 of the measurement object 27 in question are approached by a traversing movement of the measuring table 21.

In a step 57, the measured values of the individual measurement locations P1 to P5 of the measurement object 27 in question are detected and evaluated in the data processing device 32. The evaluation is carried out on the basis of predefined set values to which tolerance ranges can be assigned. The tolerance ranges or tolerance values at the individual measurement locations P1 to P5 can be determined by the user and assigned individually and independently of each other. The user can determine this themself via a test plan before starting the measurement task. For example, the measurement locations P1, P2 and P3 can be assigned a tolerance range of, for example, 10% and the measurement locations P4 and P5 can be assigned a larger or smaller percentage tolerance range. This can also be dependent on the particular function of the measurement location of the measurement object 27.

In a step 58, the measurement results are logged and output. For example, the measurement results can be output on a display, or an indicator as shown in FIG. 5. Alternatively, the measurement results can be output in tabular form with a simultaneous evaluation of good and bad parts or an evaluation of the measurement location. This good and bad output can also be designated by a color marking.

In a step 59, for example, the housing cover 16 is opened and the measuring table 21 is transferred to the loading and unloading position 35. The measurement objects 27 are removed from the measuring table 21 and sorted as a good or bad part according to the evaluation. Subsequently, a new measurement can be carried out by means of the measuring apparatus 11.

The specific devices and portions or elements of devices described herein are not required and may be substituted for one or more different devices or elements. Additional devices and elements of devices may also be included though not described or illustrated herein. One or more methods or steps of a method described herein may not be performed, or steps or methods may be performed in addition to those described. Still further, the sequence in which methods or steps of methods are listed are not necessarily the order in which they are performed. Also, the concepts have been described with reference to specific embodiments. However, one of ordinary skill in the art appreciates that various modifications and changes can be made without departing from the scope of the claims as set forth below. Accordingly, the specification and figures are to be regarded in an illustrative rather than a restrictive sense, and all such modifications are intended to be included within the scope of the claims.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

Although multiple embodiments have been illustrated in the accompanying Drawings and described in the foregoing Detailed Description, it should be understood that the claims are not limited to the disclosed embodiments, but is capable of numerous rearrangements, modifications, and substitutions without departing from the scope thereof.

The invention claimed is:

1. A method for measuring a plurality of measurement objects using X-ray fluorescence in a measurement apparatus, having a measuring table, comprising:
   providing the plurality of measurement objects on the measuring table;
   capturing an overview image of the plurality of measurement objects on the measuring table;
   determining a type of a first measurement object of the plurality of measurement objects from at least one of: the overview image, or an identifier provided on the first measurement object, or an identifier positioned adjacently to the first measurement object on the measuring table;
   determining a position and/or an alignment of the first measurement object on the measuring table using the overview image;
   moving the measuring table to align at least one measurement location of the first measurement object with a measurement point of an X-ray fluorescence device;
   determining at least one measured value from the at least one measurement location of the first measurement object using the X-ray fluorescence device;
   comparing the at least one measured value of the at least one measurement location of the first measurement object with a setpoint value stored in a data processing device; and
   outputting a measurement result for the at least one measurement location of the first measurement object.

2. The method according to claim 1, wherein capturing an overview image of the plurality of measurement objects on the measuring table, comprises:
   capturing an overview image of a majority of a top surface area of the measuring table by an optical device.

3. The method according to claim 1, wherein determining the type of the first measurement object from at least one of: the overview image, or the identifier provided on the first measurement object, or the identifier positioned adjacently to the first measurement object on the measuring table, comprises:
   positioning the identifier on the first measurement object or adjacently to the first measurement object on the measuring table;
   processing the identifier, wherein the identifier includes a measurement task; and
   performing the measurement task by a control device.

4. The method according to claim 1, further comprising:
   determining a tolerance range of the measurement location of the first measurement object.

5. The method according to claim 1, wherein aligning the at least one measurement location of the first measurement object with the measurement point of the X-ray fluorescence device, comprises:
   determining by the control device a position and/or the alignment of the first measurement object in an X'/Y' measurement object coordinate system; and
   mapping by the control device the position and/or the alignment of the first measurement object in the X'/Y' measurement object coordinate system to an X/Y measuring table coordinate system.

6. The method according to claim 5, wherein aligning the at least one measurement location of the first measurement object with the measurement point of the X-ray fluorescence device, further comprises:
   moving by the control device the measuring table in an X and/or Y direction to align the measurement location of the first measurement object with the measurement point.

7. The method according to claim 1, wherein the measurement results determined by the measurement location of the first measurement object in question are output with a good or bad indication assigned to the measurement location.

8. The method according to claim 7, wherein in the overview image determined by the optical device, which comprises region of the measuring table with the first measurement object, the good or bad indication is output assigned to the measurement location of the first measurement object.

9. The method according to claim 8, wherein the determined measured value is additionally displayed at the relevant measurement location of the first measurement object.

10. The method according to claim 1, wherein, after the detection or determination of a measurement task to be carried out, a calibration of the measuring apparatus as a function of the measurement task to be carried out is activated and carried out before the measurement task is started.

11. The method according to claim 1, wherein a measuring chamber of the housing is opened at the beginning of a measurement task to be carried out and, after the measuring table has been equipped with the plurality of measurement objects, the measurement task is started by a start signal and initially the measuring chamber of the housing is closed, the measurements are carried out in accordance with the measurement task and, after the measurement task has been carried out, the measuring chamber of the housing is opened to remove the first measurement object.

12. The method according to claim 11, wherein the measuring chamber of the housing is opened or closed by a housing cover which is pivotably, slidably, or movably controlled using a motor.

13. The method according to claim 11, wherein, for loading and unloading the plurality of measuring objects, the measuring table is moved into a loading and unloading position in which the measuring table is at least partially guided out of the closable measuring chamber of the housing, and in that, for carrying out the measurement task, the measuring table is moved into a working position which is located inside the measuring chamber.

14. The method according to claim 1, further comprising:
  initiating a measurement task using a button element on the housing.

15. A measuring apparatus for measuring a plurality of measurement objects, comprising:
  a housing;
  a measuring table in the housing that is movable relative to the housing;
  an optical device, wherein the optical device is configured to capture an overview image of region of the measuring table that includes measurement location of a first measurement object of the plurality of measurement objects;
  an X-ray fluorescence device comprising a radiation source and a detector that are aligned with a measurement point on the measuring table;
  a control device configured to:
    determine a position and/or an alignment of the first measurement object on the measuring table;
    align measurement location of the first measurement object with the measurement point of the X-ray fluorescence device;
    determine measured value from the measurement location of the first measurement object using the X-ray fluorescence device;
    compare the measured value of the measurement location of the first measurement object with a setpoint value stored in a data processing device; and
    output a measurement result for the measurement location of the first measurement object.

16. The measuring apparatus of claim 15, wherein the control device is configured to align the measurement location of the first measurement object with the measurement point of the X-ray fluorescence device by:
  controlling a motor to move the measuring table in an X and/or Y direction until the measurement location of the first measurement object is aligned with the measurement point.

17. The measuring apparatus of claim 15, further comprising:
  an optical device positioned in the housing, wherein the optical device is configured to capture an overview image of region of the measuring table that includes the at least one measurement location of the first measurement object.

18. The measuring apparatus of claim 17, wherein the control device is further configured to:
  determine a position and/or the alignment of the first measurement object in an X'/Y' measurement object coordinate system using the overview image;
  map the position and/or the alignment of the first measurement object in the X'/Y' measurement object coordinate system to an X/Y measuring table coordinate system; and
  align the first measurement object with the measurement point of the X-ray fluorescence device.

19. The measuring apparatus of claim 15, wherein the control device is further configured to:
  process an identifier captured in the overview image, wherein the identifier includes a type of the first measurement object and a measurement task; and
  perform the measurement task.

20. The measuring apparatus of claim 15, further comprising:
  a housing cover or a housing opening for opening and closing a measuring space in the housing, wherein the measuring table is accessible when the housing is opened for loading and unloading the measuring table with the first measurement object.

* * * * *